United States Patent
Pietron et al.

(10) Patent No.: US 9,050,982 B2
(45) Date of Patent: Jun. 9, 2015

(54) DRIVER FEEDBACK FOR VEHICLE OPERATION

(71) Applicant: Ford Global Technologies, LLC, Dearborn, MI (US)

(72) Inventors: Gregory Michael Pietron, Canton, MI (US); Jeffrey Allen Doering, Canton, MI (US); Hong Jiang, Birmingham, MI (US); Bradley Dean Riedle, Northville, MI (US); Diana Yanakiev, Birmingham, MI (US); Joseph F. Kucharski, Livonia, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 21 days.

(21) Appl. No.: 13/740,105

(22) Filed: Jan. 11, 2013

(65) Prior Publication Data

US 2014/0200789 A1 Jul. 17, 2014

(51) Int. Cl.
*B60T 7/12* (2006.01)
*B60W 50/08* (2012.01)
*B60W 30/14* (2006.01)
*B60W 50/00* (2006.01)

(52) U.S. Cl.
CPC ............. *B60W 50/085* (2013.01); *B60W 30/14* (2013.01); *B60W 2050/0063* (2013.01)

(58) Field of Classification Search
USPC ...................................................... 701/91, 93
See application file for complete search history.

(56) References Cited

U.S. PATENT DOCUMENTS

| | | | |
|---|---|---|---|
| 6,076,622 A * | 6/2000 | Chakraborty et al. | 180/169 |
| 6,081,762 A | 6/2000 | Richardson et al. | |
| 6,577,937 B1 | 6/2003 | Shuman et al. | |
| 8,214,122 B2 | 7/2012 | Krupadanam et al. | |
| 2004/0084237 A1* | 5/2004 | Petrie, Jr. | 180/170 |
| 2004/0195022 A1* | 10/2004 | Inoue | 180/170 |
| 2006/0231074 A1* | 10/2006 | Ueno et al. | 123/399 |
| 2008/0243351 A1* | 10/2008 | Isogai et al. | 701/96 |
| 2010/0004848 A1* | 1/2010 | Transou, Jr. | 701/110 |
| 2011/0035135 A1* | 2/2011 | Schwalm et al. | 701/110 |
| 2011/0238272 A1* | 9/2011 | Kato | 701/55 |
| 2012/0078496 A1 | 3/2012 | Lindhuber et al. | |
| 2013/0096808 A1* | 4/2013 | DeLaSalle et al. | 701/110 |

* cited by examiner

*Primary Examiner* — Hussein A. Elchanti
(74) *Attorney, Agent, or Firm* — Greg Brown; Alleman Hall McCoy Russell & Tuttle LLP

(57) ABSTRACT

The following description relates to systems and methods for adjusting vehicle response parameters in response to indications of vehicle operator preferences. In one example approach, a method comprises, during a cruise control mode of operation, adjusting a vehicle response parameter from a default set-point based on an indication of vehicle operator preference.

15 Claims, 4 Drawing Sheets

DRIVER FEEDBACK FOR VEHICLE OPERATION

BACKGROUND AND SUMMARY

Vehicle control features, such as cruise control, may be used by vehicles to maintain vehicle and/or engine operation at set-points associated with the control feature. For example, a cruise control feature may be initiated by a vehicle operator to maintain a speed of the vehicle at a set-point specified by the operator. Such features may utilize a fixed interface with predetermined calibration levels for powertrain control. For example, such predetermined calibration levels associated with a control feature may dictate vehicle response parameters during different modes of vehicle operation while the feature is enabled.

The inventors herein have recognized that powertrain control may depend on several factors that are not easily included in the base calibration of a control feature, and may depend on driver preference, or vehicle configuration. For example, when using a control feature, such as cruise control, a driver may prefer different vehicle responses from those included in predetermined calibrations associated with the control feature. For example, during cruise control a driver may prefer a different braking or acceleration response than that which is set in a default control strategy associated with the cruise control feature. Control features which utilize fixed interfaces with a limited number of available switches and input mechanisms and predetermined calibration levels may preclude options for fine tuning selections to satisfy the driver. In particular, such approaches may not take into account driver preferences and vehicle conditions during implementation of control features.

In order to at least partially address these issues, in one example approach a method is provided for controlling a vehicle. The method comprises during a cruise control mode of operation, adjusting a vehicle response parameter from a default set-point based on an indication of vehicle operator preference. For example, a vehicle operator may be queried concerning a vehicle response and tunable parameters may be modified, with continued feedback from the vehicle operator.

In this way, interaction with a vehicle operator during vehicle control strategies may be used to customize vehicle response parameters based on vehicle operator preferences. For example, driver response to vehicle events, such as engagements, shifting, deceleration, acceleration, braking, etc., may be captured and vehicle response parameters adjusted accordingly. Such an approach may provide interaction, feedback, and customization of vehicle operation to increase a driver's connection with vehicle. Further, features such as adaptive cruise control could benefit from gain changes to increase brake or throttle response. As another example, fuel economy may be increased if a controller allows slight increases/decreases in vehicle speed while going up or down grade, but is calibrated for some speed error to acceleration response.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
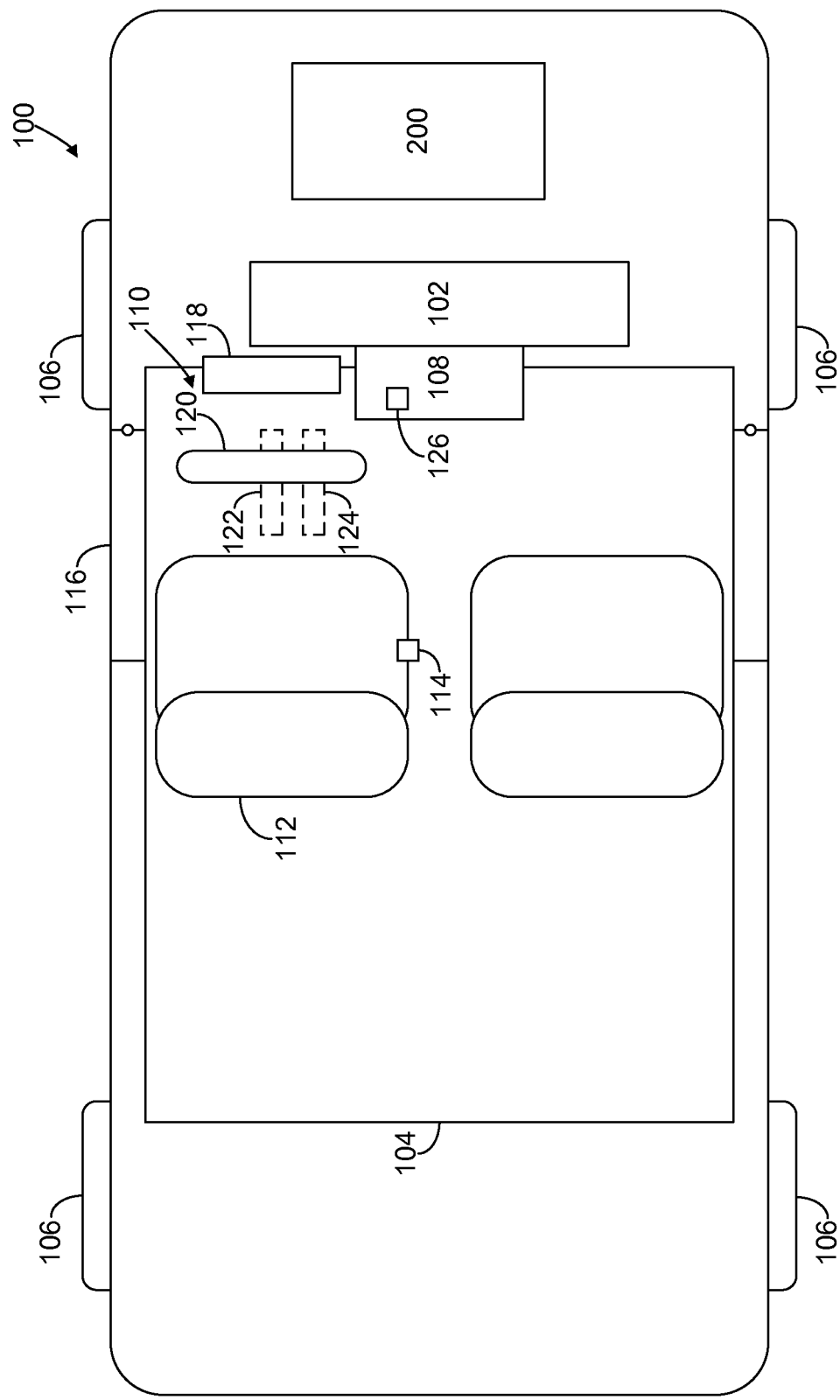
FIG. 1 shows a schematic depiction of an example vehicle system in accordance with the disclosure.
Figure 2:
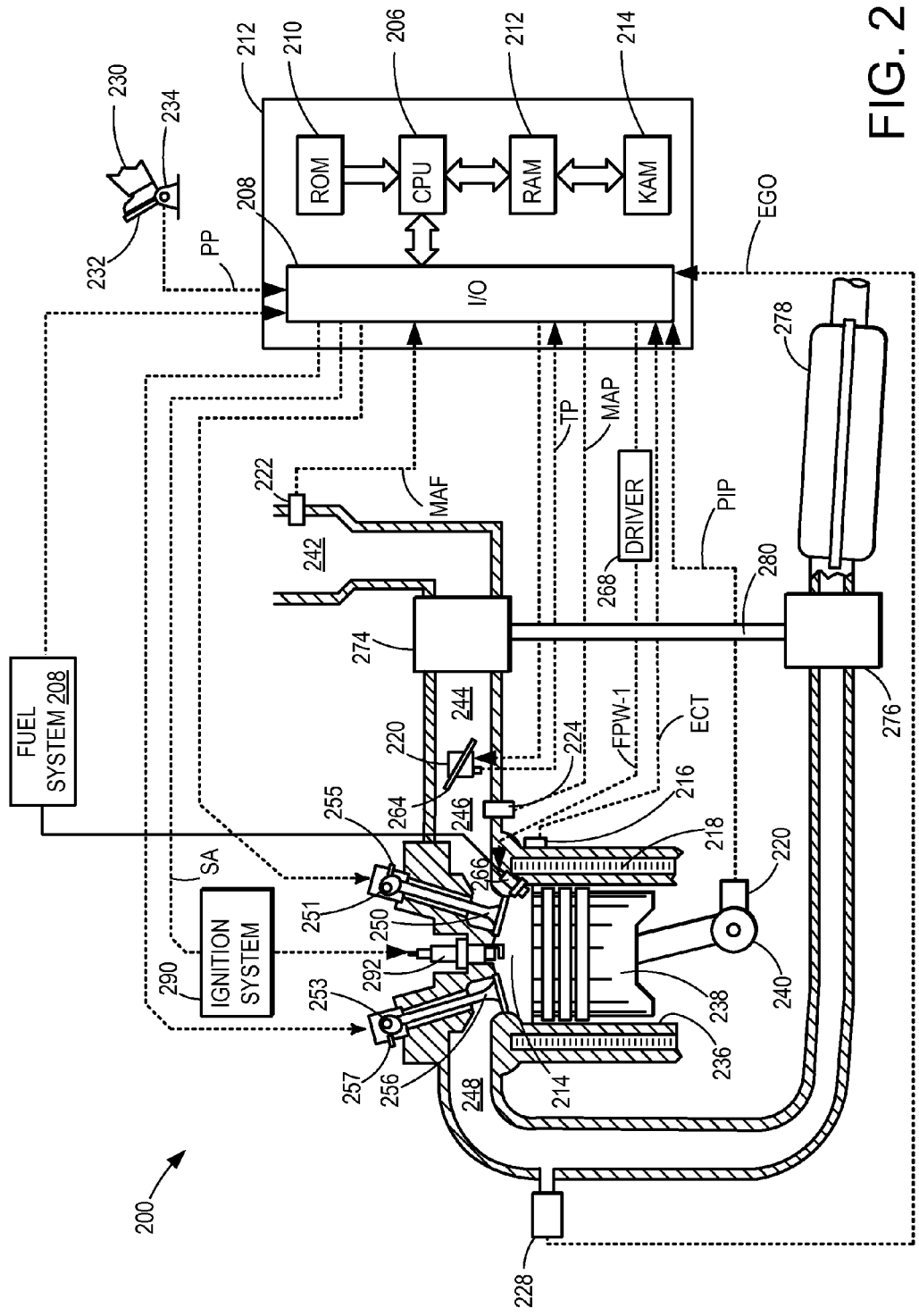
FIG. 2 shows a schematic depiction of an example engine.
Figure 3:
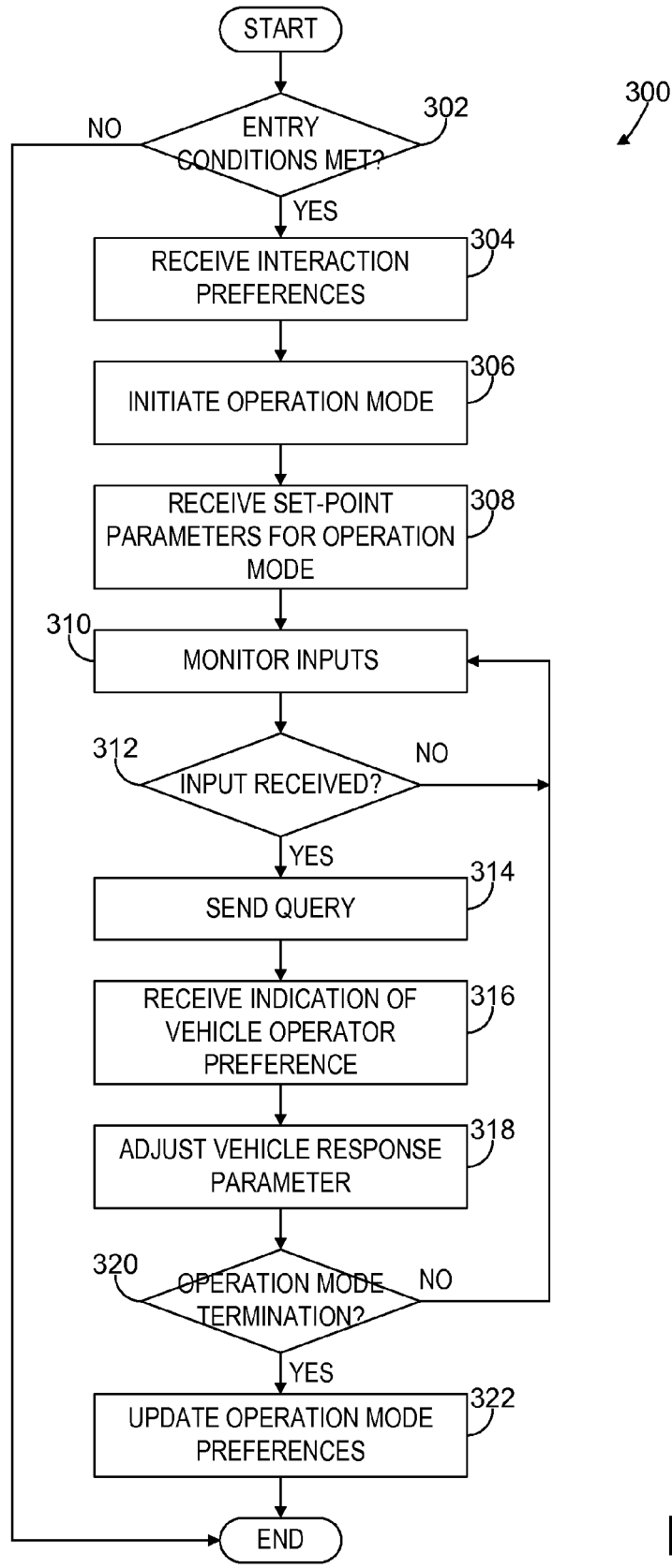
FIG. 3 shows an example method for operating a vehicle in accordance with the disclosure.

The following description relates to systems and methods for operating a vehicle, such as the vehicle shown in FIG. 1, with an engine, such as the engine shown in FIG. 2, to adjust vehicle response parameters in response to indications of vehicle operator preferences. For example, as shown in FIG. 3, a vehicle operator may be queried concerning a vehicle response and tunable parameters may be modified, with continued feedback from the vehicle operator to customize vehicle response parameters based on vehicle operator preferences.

Turning now to the figures, FIG. 1 shows an example vehicle 100 with an engine 200 and a vehicle control system 102. Vehicle 100 may be any suitable vehicle. For example, as shown in FIG. 1, vehicle 100 may include an engine 200 in some examples. However, in other examples, vehicle 100 may be an electric vehicle, a hybrid electric vehicle, or other type of vehicle with or without an engine. For example, vehicle 100 may be a hybrid electric vehicle, and engine 200 may be a gasoline or diesel engine. As another example, vehicle 100 may be an electric vehicle and may include a motor 200. An example engine is described in more detail below with regard to FIG. 2.

Vehicle 100 has drive wheels 106 and a passenger cabin 104. Passenger cabin 104 may include one or more seats, e.g., a vehicle operator, or driver, seat 112 adjacent to vehicle operator controls 110. Vehicle 100 may further include one or more doors, for example, a vehicle door 116 adjacent to driver seat 112.

Vehicle operator controls 110 may include any suitable input devices used by an operator of vehicle 100 to control operation of vehicle 100 and/or to initiate vehicle control strategies, such as adaptive cruise control (ACC). For example, vehicle operator controls may include a steering wheel 120, an accelerator pedal 124, a brake pedal 122, and an operation mode input device 118. For example, operation mode input device may be a PRNDL selector or a gear shifting device. Other example vehicle operator controls include a gear shifting apparatus, a clutch pedal, a cruise control actuation and control device, etc. For example, a cruise control actuation device may be used to initiate a cruise control mode of operation and may further be used to adjust set-point parameters for the cruise control mode. For example, a vehicle operator may set a speed, braking response, acceleration response, a following distance etc., via one or more inputs in the operator controls 110. In some examples, predetermined set-points or calibration levels may be used following an initiating of a vehicle control feature. For example, following an initiation of an ACC mode of operation, predetermined vehicle response parameters or set-points may dictate how the control strategy responds to changes in engine load, engine speed, acceleration, braking, etc.

Vehicle control system 102 may be configured to adjust vehicle operating conditions in response to receiving user preference information. For example, a vehicle control interface 108 may be configured to monitor and receive indications of vehicle operator preferences via operator input to the vehicle control interface. Vehicle control interface 108 may include any suitable devices for querying a vehicle operator and monitoring vehicle operator responses. As described below with regard to FIG. 3, such vehicle operator responses may be used to adjust control feature operation response parameters. This interactive feature could be as interactive or as passive as the driver requests. For example, a vehicle operator may specify interaction preferences which indicate whether or not the driver prefers to use the interaction feature and/or specifying what types of interactions to use for different operating modes of the vehicle. For example, a vehicle operator may disable the interaction feature, so that no prompts are provided by the control interface 108 or the operator may enable the interaction feature so that control interface 108 prompts the operator for feedback during and following various vehicle operating modes. For example, such interactions may be used for deceleration, cruise control, adjusting a motor output or response, or other driver interactions.

For example, vehicle control interface 108 may include a display device for prompting a driver for input in response to a change in vehicle operation. Such a display device may display text or graphical information indicating a query or a type of action for a driver to respond to. In some examples, vehicle control interface 108 may communicate audio messages to the operator in addition to or without display and may be configured to monitor for voice responses from the vehicle operator.

Vehicle control interface 108 may include one or more input devices, such as input device 126, configured to capture vehicle operator input. Examples of input devices include buttons, touch screens, voice input/recognition, etc. For example, vehicle control interface 108 may include or display a "like button" to capture a driver response to a vehicle operating condition. For example, a rolling like button could be used with an event observer to capture customer response to many different vehicle events, such as engagements, shifting, decelerations, accelerations, braking, etc. In some examples, event names and requests could be displayed in the vehicle or verbalized via vehicle control interface 108. Vehicle operator input could be performed via speed control paddles, OK buttons (left no, right yes, or vice-versa per user preference), touch screen buttons, voice input, or other customer preferred input. For more complex interactions, additional details may be ascertained by a series of inquiries to determine customer preferences or vehicle configuration. Such inquiry can be set for vehicle startup and/or vehicle configuration detection.

Various sensors may be used by vehicle control interface 108 to determine a profile of a vehicle operator. Such vehicle operator profiles may be stored in a memory component of control interface 108 and may include user-specific interaction preferences. For example, a seat sensor 114, e.g., a weight sensor, coupled to driver seat 112 may be used to determine an identity of vehicle operator so that interaction preferences associated with that operator may be loaded and employed during operation of the vehicle. In other examples, control interface 108 may prompt a driver to identify one or more interaction preferences before or during a vehicle operation cycle. For example, in response to door 116 opening and closing (indicating a driver has entered the vehicle), control interface 108 may prompt the operator to ascertain driving preferences or load an interaction preference profile associated with the driver. As another example, in response to a vehicle start-up from rest, control interface 108 may prompt the operator to ascertain driving preferences or load an interaction preference profile associated with the driver FIG. 2 depicts an example embodiment of a combustion chamber or cylinder of internal combustion engine 20. Engine 20 may receive control parameters from a control system including controller 212 and input from a vehicle operator 230 via an input device 232. In this example, input device 232 includes an accelerator pedal and a pedal position sensor 234 for generating a proportional pedal position signal PP. Cylinder (herein also "combustion chamber") 214 of engine 200 may include combustion chamber walls 236 with piston 238 positioned therein. Piston 238 may be coupled to crankshaft 240 so that reciprocating motion of the piston is translated into rotational motion of the crankshaft. Crankshaft 240 may be coupled to at least one drive wheel of the passenger vehicle via a transmission system. Further, a starter motor may be coupled to crankshaft 240 via a flywheel to enable a starting operation of engine 200.

Cylinder 214 can receive intake air via a series of intake air passages 242, 244, and 246. Intake air passage 246 may communicate with other cylinders of engine 200 in addition to cylinder 214. In some embodiments, one or more of the intake passages may include a boosting device such as a turbocharger or a supercharger. For example, FIG. 2 shows engine 200 configured with a turbocharger including a compressor 274 arranged between intake passages 242 and 244, and an exhaust turbine 276 arranged along exhaust passage 248. Compressor 274 may be at least partially powered by exhaust turbine 276 via a shaft 280 where the boosting device is configured as a turbocharger. However, in other examples, such as where engine 200 is provided with a supercharger, exhaust turbine 276 may be optionally omitted, where compressor 274 may be powered by mechanical input from a motor or the engine. A throttle 220 including a throttle plate 264 may be provided along an intake passage of the engine for varying the flow rate and/or pressure of intake air provided to the engine cylinders. For example, throttle 220 may be disposed downstream of compressor 274 as shown in FIG. 2, or alternatively may be provided upstream of compressor 274.

Exhaust passage 248 may receive exhaust gases from other cylinders of engine 200 in addition to cylinder 214. Exhaust gas sensor 228 is shown coupled to exhaust passage 248 upstream of emission control device 278 although in some embodiments, exhaust gas sensor 228 may be positioned downstream of emission control device 278. Sensor 228 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be measured by one or more temperature sensors (not shown) located in exhaust passage 248. Alternatively, exhaust temperature may be inferred based on engine operating conditions such as speed, load, air-fuel ratio (AFR), spark retard, etc. Further, exhaust temperature may be computed by one or more exhaust gas sensors 228. It may be appreciated that the exhaust gas temperature may alternatively be estimated by any combination of temperature estimation methods listed herein.

Each cylinder of engine 200 may include one or more intake valves and one or more exhaust valves. For example, cylinder 214 is shown including at least one intake poppet valve 250 and at least one exhaust poppet valve 256 located at an upper region of cylinder 214. In some embodiments, each cylinder of engine 200, including cylinder 214, may include at least two intake poppet valves and at least two exhaust poppet valves located at an upper region of the cylinder.

Intake valve 250 may be controlled by controller 212 by cam actuation via cam actuation system 251. Similarly, exhaust valve 256 may be controlled by controller 212 via cam actuation system 253. Cam actuation systems 251 and 253 may each include one or more cams and may utilize one or more of cam profile switching (CPS), variable cam timing (VCT), variable valve timing (VVT) and/or variable valve lift (VVL) systems that may be operated by controller 212 to vary valve operation. The operation of intake valve 250 and exhaust valve 256 may be determined by valve position sensors (not shown) and/or camshaft position sensors 255 and 257, respectively. In alternative embodiments, the intake and/or exhaust valve may be controlled by electric valve actuation. For example, cylinder 214 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 214 can have a compression ratio, which is the ratio of volumes when piston 238 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 200 may include a spark plug 292 for initiating combustion. Ignition system 290 can provide an ignition spark to combustion chamber 214 via spark plug 292 in response to spark advance signal SA from controller 212, under select operating modes. However, in some embodiments, spark plug 292 may be omitted, such as where engine 200 may initiate combustion by auto-ignition or by injection of fuel as may be the case with some diesel engines.

In some embodiments, each cylinder of engine 200 may be configured with one or more fuel injectors for delivering fuel. As a non-limiting example, cylinder 214 is shown including one fuel injector 266. Fuel injector 266 is shown coupled directly to cylinder 214 for injecting fuel directly therein in proportion to the pulse width of signal FPW received from controller 212 via electronic driver 268. In this manner, fuel injector 266 provides what is known as direct injection (hereafter also referred to as "DI") of fuel into combustion cylinder 214. While FIG. 2 shows injector 266 as a side injector, it may also be located overhead of the piston, such as near the position of spark plug 292. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 266 from a high pressure fuel system 208 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 212.

It will be appreciated that, in an alternate embodiment, injector 266 may be a port injector providing fuel into the intake port upstream of cylinder 214. Further, while the example embodiment shows fuel injected to the cylinder via a single injector, the engine may alternatively be operated by injecting fuel via multiple injectors, such as one direct injector and one port injector. In such a configuration, the controller may vary a relative amount of injection from each injector.

Fuel may be delivered by the injector to the cylinder during a single cycle of the cylinder. Further, the distribution and/or relative amount of fuel or knock control fluid delivered from the injector may vary with operating conditions, such as air charge temperature, as described herein below. Furthermore, for a single combustion event, multiple injections of the delivered fuel may be performed per cycle. The multiple injections may be performed during the compression stroke, intake stroke, or any appropriate combination thereof.

As described above, FIG. 2 shows only one cylinder of a multi-cylinder engine. As such each cylinder may similarly include its own set of intake/exhaust valves, fuel injector(s), spark plug, etc.

FIG. 3 shows an example method 300 for controlling a vehicle by adjusting vehicle response parameters in response to vehicle operator preferences. The method of FIG. 3 may be used to provide interactions with a vehicle operator during vehicle control strategies in order to customize vehicle response parameters based on indications of vehicle operator preferences. For example, driver response to vehicle events, such as engagements, gear shifting, deceleration, acceleration, braking, etc., may be captured and vehicle response parameters adjusted accordingly. Such an approach may provide interaction, feedback, and customization of vehicle operation to increase a driver's connection with vehicle.

At 302, method 300 includes determining if entry conditions are met. Entry conditions may include a vehicle operator entering the vehicle, e.g., via determining if a vehicle door is opened and closed, or a vehicle start from rest, e.g., an engine ignition event. As another example, entry conditions may include an interaction feature initiation request. For example, during vehicle operation or during a vehicle start-up, a vehicle operator may enable the interaction feature so that the vehicle operator can provide feedback on vehicle response during operation. For example, a vehicle operator may turn on the interaction feature via a user input on control interface 108 to initiate the interaction feature.

If entry conditions are met at 302, method 300 proceeds to 304. At 304, method 300 includes receiving interaction preferences. For example control interface 108 may load interaction preferences based on an identified driver profile stored in a memory component of control interface 108. For example, as described above, a vehicle operator may be identified based on one or more sensors readings, e.g., seat sensor 114, and/or by prompting a vehicle operator at or during vehicle start-up to determine interaction preferences. In some examples, a drive may desire to have no interactions occur during a vehicle operation cycle thus may disable the interaction feature for a duration of the vehicle operation cycle. As another example, a driver may desire that the interaction feature is enabled only during certain types of vehicle operation modes, e.g., only during cruise control mode, and disabled at other times during vehicle operation. Further still interaction preferences may include user-specific privacy and profile information. For example, an interaction profile for an operator may specify whether or not to share driver response information with other users or whether or not to save driver response information for subsequent vehicle operations. Further, interaction preferences may include user-specified input preferences. For example, a user may specify whether or not to use physical input, such as a touch screen, or voice input to respond to prompts from the control interface.

At 306, method 300 includes initiating an operating mode. In some examples, initiating an operating mode may include initiating any vehicle operation mode. In some examples, the interaction feature may be used to monitor driver responses to conditions throughout a duration of a vehicle operation cycle.

However, in other examples, the interaction feature may be used to monitor driver responses during specific operational modes of the vehicle. For example, a driver may initiate an adaptive cruise control operation mode and the interaction feature may be used to monitor driver response while cruise control is in operation. For example, a driver may initiate an adaptive cruise control (ACC) feature while following a vehicle by selecting an ACC mode from a vehicle input device.

At 308, method 300 includes receiving set-point parameters for the operation mode. For example, control interface 108 may include pre-set calibration levels for various operating modes of the vehicle. For example, in ACC mode, control interface 108 may include pre-determined response parameters for acceleration, braking, and/or maintaining a following distance. In some examples, a vehicle operator may set a desired following distance while in ACC mode. For example, a driver may set a two car following distance or a driver may set a three car following distance. In some examples, set-points associated with the operation mode, in this case ACC mode, may be used to automatically adjust the vehicle or engine response to conditions such as engine load, acceleration pedal input, brake pedal input, distance from surrounding vehicles or objects, etc. For example, if a driver sets a two car following distance in ACC mode, pre-set calibration levels may be used to respond to driver input via the accelerator pedal or brake pedal.

At 310, method 300 includes monitoring inputs. For example, control interface 108 may monitor driver inputs such as the accelerator pedal, brake pedal, gear changes, etc. In some examples, control interface 108 may monitor driver inputs and determine whether or not the driver inputs fall outside of an expected driver input as determined by the set-point calibration levels for the operation mode. For example, if a driver presses the accelerator pedal an increased amount in ACC mode on a downhill stretch while following a car, this may indicate that a driver desires to decrease a following distance from the set-point value. As another example, if a driver is providing more braking pedal input that expected for ACC mode, this may indicate that the driver desires an increased brake pedal response.

At 312, method 300 includes determining if input is received. In some examples, the interaction feature may query a driver following any driver input while a control feature is initiated or during vehicle operation in order to prompt the operator for input regarding vehicle response. For example, if a user presses the brake pedal during vehicle operation, the control interface may prompt a driver to indicate whether or not the vehicle response was satisfactory to the driver. In other examples, the interaction feature may only query a driver when a driver input is not an expected input for a particular mode of operation. For example, if a driver input is identified and falls outside of an expected driver input range as determined by the set-point calibration levels for the operation mode, then the control interface may query the driver. For example, if a driver presses the accelerator pedal an increased amount or if driver is providing more braking pedal input than expected for ACC mode, then the driver may be queried.

If input is not received at 312, method 300 continues to monitor input at 310. However, if input is received at 312, method 300 proceeds to 314. At 314, method 300 includes sending a query. For example, control interface 108 may query the vehicle operator for a response on whether or not the vehicle response during the operation mode is satisfactory or acceptable to the driver. In some examples, an event name and request may be provided to the vehicle operator, e.g., via a display or verbalized via an audio indication. For example, control interface 108 may display a "like button" to the driver to query whether or not the vehicle response was satisfactory. As another example, the control interface 108 may provide an audio query to the driver to query whether or not the vehicle response was satisfactory. As still another example, the control interface may prompt the vehicle operator for input regarding how vehicle response should be adjusted. For example, if a driver is providing accelerator input at an increased amount during ACC mode, control interface 108 may prompt a driver on whether or not to increase a following distance or whether or not to increase accelerator pedal response. For example, the interface manager may prompt the driver if they would like faster acceleration to follow the car in front. As another example, if a driver is providing increased braking, the control interface may prompt the driver on whether or not to increase the following distance or whether or not to increase the brake pedal response.

At 316, method 300 includes receiving an indication of vehicle operator preference. As remarked above, control interface 108 may receive driver preference information in a variety of ways, e.g., via a "like button", a verbal response from the driver, one or more touches on a touch screen display device, control paddles, buttons, or other user specified input. For more complex interactions, additional details may be ascertained by a series of inquiries to determine customer preferences or vehicle configuration. For example, control interface 108 may prompt the driver again after receiving an initial indication of vehicle operator preference to further clarify driver preference.

At 318, method 300 includes adjusting a vehicle response parameter. For example, if a driver response to a query from control interface 108 indicates that the vehicle response was satisfactory, e.g., if the driver presses a "like button", then the vehicle response parameter may not be adjusted. However, if a driver indicates that the vehicle response was unsatisfactory, e.g., by not pressing the "like button" or via some other response, then the control interface may further query the driver to determine how to adjust the vehicle response parameters.

As another example, if the interface manager prompts a driver if they would like faster acceleration to maintain a targeted vehicle speed, e.g., in response to the driver pressing the accelerated pedal an increased amount, and the driver confirms, e.g., by pressing a "like button", then the interface manager may send a request the vehicle controller or powertrain control to reduce allowed vehicle error.

As another example, if a driver presses the brake an increased amount on a downhill stretch while following a car in ACC mode, the interface manager may query the driver if they would like faster braking to follow the car in front. In this example, if the driver responds with a confirmation, e.g., by pressing a "like button" or via a verbal communication, then the interface manager may provide information to the powertrain controller to increase vehicle braking response. As yet another example, if the driver is still braking during ACC mode, the interface manager may infer that there is a trailer or increased load attached to the vehicle and may perform a load estimate and/or may send a query to the driver with an estimation of mass increase or to prompt a driver if a trailer or heavy load is present. In this example, if the driver provides a confirmation response, then ACC may be modified for an increased load.

In an example wherein a vehicle is an electric vehicle or other type of vehicle, at 318, method 300 may include adjusting a motor output and/or a motor output response parameter in response to receiving user preference data. For example, a motor output may be increased in response to an increased pedal input, e.g., an accelerator pedal, and a vehicle operator's response to a query. As another example, a motor output may be decreased in response to an increased pedal input, e.g., a brake pedal, and vehicle operator's response to a query.

At 320, method 300 includes determining if an operation mode termination event occurs. For example, the vehicle operator may terminate the interaction feature during vehicle operation or the vehicle operator may terminate the ACC mode or the mode of operation may end. If the operation mode is not terminated at 320, method 300 continues to monitor inputs at 310. However, if the operation is terminated at 320, method 300 proceeds to 322.

At 322, method 300 includes updating operation mode preferences. For example, if specified in the interaction preferences for the vehicle operator, vehicle response parameters may be updated and saved in a memory component of control interface 108 based on the driver input during vehicle operation. These updated response parameters may be stored in memory and associated with the driver profile for subsequent vehicle operation. Further, in some examples, such updates may be shared with other users of the vehicle or with a central data repository in order to increase vehicle performance and customer satisfaction.

Figure 4:
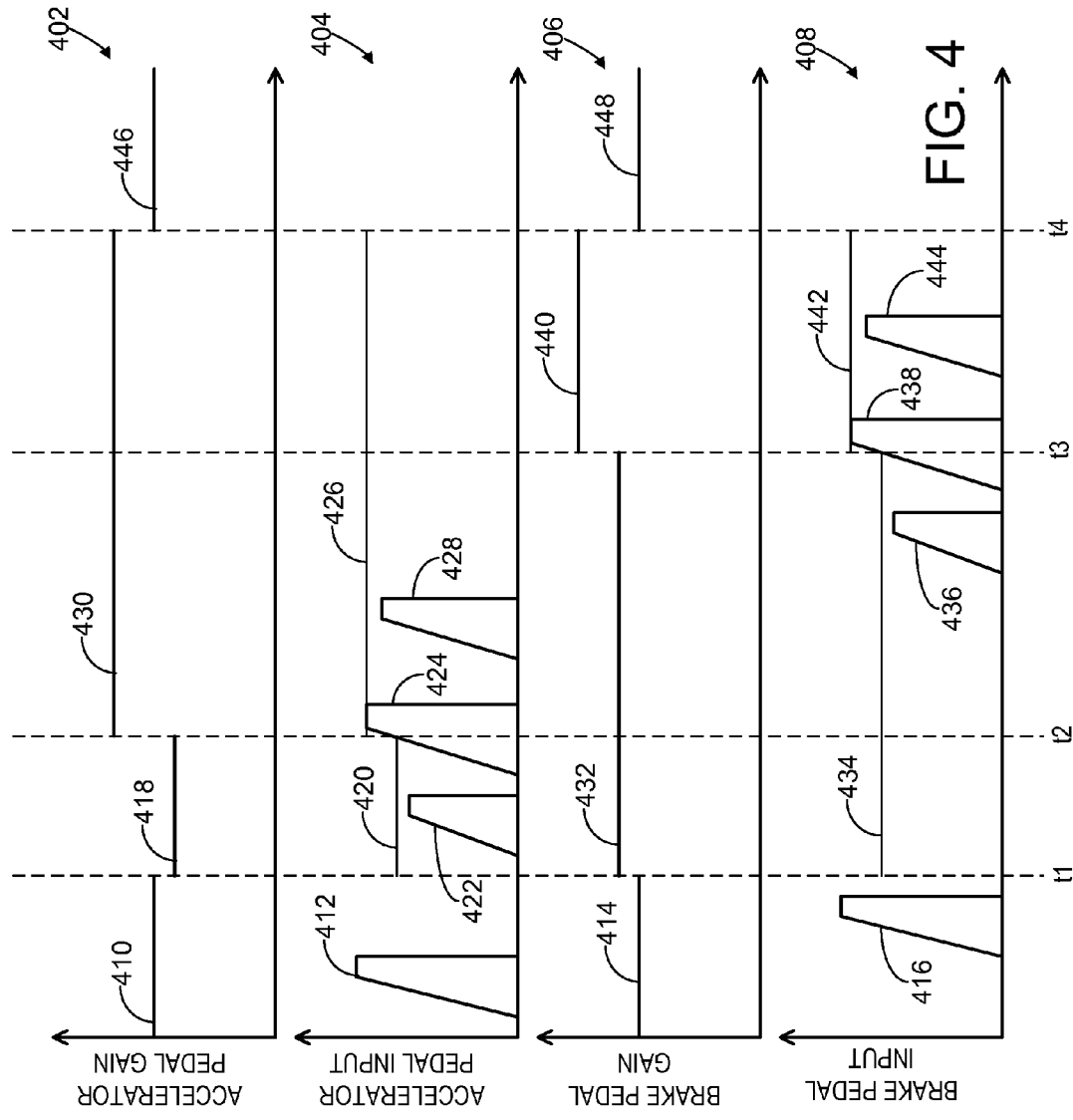
FIG. 4 illustrates an example method for operating a vehicle in accordance with the disclosure.

FIG. 4 shows example graphs illustrating an example implementation of a method of operating a vehicle in accordance with the disclosure. For example, FIG. 4 may illustrate an example implementation of the method described above with regard to FIG. 3. In particular, an amount of gain associated with a vehicle input, such as an accelerator pedal and/or a brake pedal, may be adjusted during a mode of operation, such as during cruise control mode, in response to receiving an indication of a vehicle operator preference. As described above, in response to a driver may be prompted to provide feedback. In some examples, vehicle response parameters, such as an amount of gain associated with a vehicle input, may be adjusted based on received feedback from the driver.

At 402, FIG. 4 shows an example graph of an accelerator pedal gain amount versus time. At 404, FIG. 4 shows an example graph of accelerator pedal input applied over time. At 406, FIG. 4 shows an example graph of brake pedal gain amount versus time; and, at 408, FIG. 4 shows an example graph of brake pedal input over time.

At time t1 in FIG. 4, a mode of operation may be initiated. For example, at time t1 a vehicle operator may initiate a cruise control mode and may set various parameters, such as following distance, as described above with regard to FIG. 3. Before cruise control is initiated at time t1, an amount of gain associated with the accelerator pedal may be set to a predetermined calibrated value 410. Likewise, before time t1, an amount of gain associated with the brake pedal may be set to a predetermined calibrated value 414. The amount of gain associated with a vehicle input may dictate how the signal received from the vehicle input is amplified to actuate the vehicle parameter associated with the vehicle input. For example, an increase in gain associated with the accelerator pedal may increase the response of the accelerator pedal so that more acceleration is achieved with a given accelerator pedal input. Likewise, an increase in gain associated with the brake pedal may increase the response of the brake pedal so that more braking is provided with a given brake pedal input.

Before time t1, accelerator pedal input, such as input 412, may not lead to any adjustments in accelerator pedal gain 410. Likewise, before time t1, brake pedal input, such as input 416, may not lead to any adjustments in brake pedal gain 416. In other words, before initiation of cruise control at t1, the accelerator and brake pedal responses may be based on a predetermined amount of gain associated with a vehicle mode of operation and may not be changed or adjusted in response to vehicle operator input.

However, after initiation of a mode of operation, such as cruise control mode, at t1, in some examples, accelerator pedal gain and brake pedal gain may be adjusted to levels 418 and 432, respectively. These gain levels may be predetermined and specific to the cruise control mode. For example, after initiation of cruise control at t1, the accelerator pedal gain may be decreased to 418. However, in other examples, the accelerator pedal gain may increase or remain the same after initiation of cruise control mode. Likewise, after initiation of cruise control at t1, the brake pedal gain may be increased to 432. However, in other examples, the brake pedal gain may decrease or remain the same after initiation of cruise control mode.

Further, based on calibrated values associated with the cruise control mode, a threshold 420 may be associated with the accelerator pedal input, so that in response to an accelerator pedal application below the threshold 420, no changes to accelerator pedal gain are performed. For example, since input 422 is below threshold 420, no adjustments to accelerator pedal gain 418 are preformed. However, if the accelerator pedal input, such as input 424, increases above threshold 420, then at t2, the vehicle operator may be prompted for preference input as described above with regard to FIG. 3. For example, at t2, the vehicle operator may be queried as to whether or not an increased acceleration response is desired. After receiving a response from the driver, e.g., a confirmation to increase accelerator pedal response, then accelerator pedal gain may be increased to an amount 430. In some examples, the accelerator pedal input threshold may also be increased, e.g., to a threshold 426, so that any input below threshold 426 will not lead to a change in gain. Subsequent applications of the accelerator pedal, e.g., input 428, below threshold 426, may then be implemented with the increased gain 430 in order to increase accelerator pedal response during cruise control. Once cruise control is terminated at t4, the accelerator pedal gain may return to an amount 446 which may be substantially the same as amount 410 used before initiating cruise control. However, as described above, adjustments to accelerator pedal gain during cruise control mode may be saved and used for subsequent cruise control operations.

Further, based on calibrated values associated with the cruise control mode, a threshold 434 may be associated with the brake pedal input, so that in response to a brake pedal application below the threshold 434, no changes to brake pedal gain are performed. For example, since input 436 is below threshold 434, no adjustments to brake pedal gain 432 are preformed. However, if the brake pedal input, such as input 438, increases above threshold 434, then at t3, the vehicle operator may be prompted for preference input as described above with regard to FIG. 3. For example, at t3 the vehicle operator may be queried as to whether or not increased brake pedal response is desired. After receiving a response from the driver, e.g., a confirmation to increase brake pedal response, brake pedal gain may be increased to an amount 440. In some examples, the brake input threshold may also be increased, e.g., to a threshold 442, so that any input below threshold 442 will not lead to a change in gain. Subsequent applications of the brake pedal, e.g., input 444, below threshold 442, may then be implemented with the increased gain 440 in order to increase brake pedal response during cruise control. Further, in some examples, other engine operating parameters may be adjusted if a brake pedal input is continuously applied or if it exceeds the threshold 442. For example, the cruise control operation may be adjusted for increased load as described above with regard to FIG. 3.

Once, cruise control is terminated at t4, the brake pedal gain may return to an amount 448 which may be substantially the same as amount 414 used before initiating cruise control. However, as described above, adjustments to brake pedal gain during cruise control mode may be saved and used for subsequent cruise control operations.

Note that the example process flows described herein can be used with various engine and/or vehicle system configurations. The process flows described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-8, V-10, V-12, opposed 4, and other engine types. The subject matter of the present disclosure includes all novel and non-obvious combinations and subcombinations of the various systems and configurations, and other features, functions, and/or properties disclosed herein.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling a vehicle comprising:
during a cruise control mode, adjusting an amount of amplification associated with a vehicle brake pedal from a default amplification based on an indication of vehicle operator preference;
adjusting vehicle braking in response to the adjusted amount of amplification; and
providing an operator query to confirm adjusting the amount of amplification is desired before performing adjusting the amount of amplification.

2. The method of claim 1, wherein adjusting the amount of amplification includes increasing the amount of amplification.

3. The method of claim 1, further comprising receiving the indication of vehicle operator preference via operator input to a vehicle control interface.

4. The method of claim 1, further comprising monitoring vehicle operator input to a vehicle control interface and adjusting the amount of amplification based on the vehicle operator input.

5. The method of claim 1, further comprising updating a predetermined amplification to the adjusted amount of amplification during a subsequent vehicle operation.

6. The method of claim 1, further comprising querying a vehicle operator for the indication of vehicle operator preference in response to a change in vehicle operation.

7. A method for controlling a vehicle comprising:
in response to a vehicle operator input during a mode of operation, prompting a vehicle operator for a vehicle operator preference;
in response to receiving a vehicle operator response indicating the vehicle operator preference, adjusting brake pedal amplification from a predetermined amplification; and
adjusting vehicle braking in response to the adjusted brake pedal amplification.

8. The method of claim 7, wherein the mode of operation is an adaptive cruise control operation.

9. The method of claim 7, further comprising receiving interaction preferences from the vehicle operator, and where prompting the vehicle operator for the vehicle operator preference is performed based on the interaction preferences.

10. The method of claim 7, wherein the vehicle operator input is outside a range of expected input associated with the mode of operation.

11. The method of claim 7, further comprising receiving interaction preferences and prompting the vehicle operator for a vehicle operator preference based on the interaction preferences.

12. The method of claim 11, wherein receiving the interaction preferences includes determining a vehicle operator profile and loading interaction preferences associated with the vehicle operator profile.

13. The method of claim 7, further comprising updating the predetermined amplification to the adjusted brake pedal amplification during a subsequent vehicle operation.

14. The method of claim 7, further comprising adjusting motor output in response to the vehicle operator preference.

15. The method of claim 14, wherein adjusting motor output includes decreasing motor output.

* * * * *